Patented Dec. 5, 1950

2,533,033

UNITED STATES PATENT OFFICE 2,533,033

N⁴-SUCCINYLSULFANILAMIDODIAZINES

Maurice L. Moore, Nether Providence Township, Delaware County, Pa., assignor to Sharp & Dohme, Incorporated, Philadelphia, Pa., a corporation of Maryland No Drawing. Application February 18, 1943, Serial No. 476,331

3 Claims. (Cl. 260—239.7)

This invention relates to carboxyacyl-aminophenylsulfonamidodiazines and -thiazines, in which the carboxyacyl group is the radical remaining when the hydroxyl group is removed from only one of the two or more carboxyl groups of a polycarboxylic acid, and the invention covers such products containing the remaining carboxyl group or groups unaltered as well as with the hydrogen in any of such remaining carboxyl groups replaced by a carboxylate-forming element or radical.

The invention of these products comprises the usefulness of this type of product as intestinal antiseptics for combating and reducing the concentration of organisms causing intestinal infection.

The products of this invention may be represented by the general formula

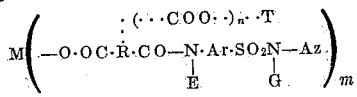

in which M may be hydrogen as well as any other radical capable of combining with a carboxyl radical to form a carboxylate, such as the metals as the alkali metals sodium, potassium, lithium and the like, the alkaline earths as calcium, magnesium, barium and the like, antimony, copper, gold, iron, bismuth and manganese and the like, an alkyl radical, a nitrogen base as ammonium and corresponding radicals of alkyl amines and alkanolamines and the like; and R is the residue of a polycarboxylic acid, aliphatic as well as aromatic, stripped of its carboxyl groups; and T may be hydrogen as well as any of the radicals represented by M and when M is polyvalent T may represent some or all of the valences of M not satisfied by the single carboxyl group to which M is illustrated as being attached; and $n$ may be zero as well as any whole number up to four, whereby the grouping ....(...COO..)$n$...T represents the carboxyl and the carboxylate groups over two from any polycarboxylic acid having more than two carboxyl groups, and $m$ is a small number equal to the valence of M when $n$ is zero and also when each occurrence of radical T is either hydrogen or any other monovalent radical and also when each occurrence of the radical T (whether mono- or poly-valent) is different from the radical M; and since M and T may be separately polyvalent, $m$ may be one when all of the carboxyl groups in the carboxyacyl radical satisfy all of the valences of such poly-valent radicals M and T; and E may be hydrogen as well as an alkyl radical having, for example, from one to about eight or more carbon atoms as well as an aryl radical such as phenyl (unsubstituted as well as substituted, for example, nitro, amino, allyl, hydroxy, alkoxy, halogen and the like substitutents); and Ar is the phenyl radical (unsubstituted as well as substituted, for example, having nitro, amino, alkyl, carboxy, sulfonic acid, hydroxy, alkoxy with the alkyl saturated or unsaturated and straight or branched chain, phenyl, halogen such as chlorine, and the like substituents); and G may be hydrogen as well as an alkyl radical, saturated or unsaturated, for example, methyl, ethyl, propyl, butyl, amyl, allyl, hexyl, heptyl, octyl and the like, or decyl, dodecyl, hexadecyl and the like and cyclopentenyl or cyclohexyl, as well as an aralkyl radical as benzyl and the like, as well as an aryl radical as phenyl (unsubstituted as well as substituted as noted for Ar above), naphthyl (similarly unsubstituted as well as substituted) and the like; and Az is the residue of a mono- as well as bi-nuclear diazine or thiazine from which the hydrogen has been removed from one of the elements of any ring in the nucleus of such compound, which compounds are exemplified by the nuclearly substituted or unsubstituted, for example, a thiazine as meta-thiazine or para-thiazine or their hydro-derivatives, either di- or tetra-hydro, and the nuclearly substituted derivatives of any of them, or a diazine such as the pyridazines (1,2-diazines or ortho-diazines), as pyridazine, or the pyrimidines (1,3,-diazines or meta-diazines), for example, pyrimidine, or the pyrazines (1,4-diazines or para-diazines), as pyrazine, or the hydro-derivatives, such as the di-, tetra- or hexa-hydro derivatives of any of these types of diazines, for example, piperazine, as well as the nuclearly substituted derivatives of any of these diazines, whether hydrogenated or not.

Any of these diazines or thiazines may be built up of fused nuclei or of linked nuclei (in which the two nuclei are joined by a single bond) and in each case may consist of bicyclic groupings containing the same number of atoms in each nucleus or a different number of atoms in each nucleus and in which one nucleus or both nuclei may be heterocyclic. The quinazolines (quinazoline and its nuclear substituted derivatives) exemplify the bicyclic groupings, e. g., the fused nuclei grouping and those in which each nucleus contains the same number of atoms, namely 6, and in which one nucleus is heterocyclic and the other homo- or iso-cyclic. The xanthines (xanthine and its nuclear substituted derivatives) are also built up of fused nuclei and illustrate the bicyclic groupings in which there is a different number of atoms in each nucleus, namely 5 and 6, and in which each nucleus is heterocyclic, while the substituted pyrimidyl derivatives such as phenyl-pyrimidines (whether substituted in either or each nucleus) represent the binuclear groupings in which each nucleus has the same number of carbon atoms, namely 6 and 6, and in which the two nuclei are linked together by a single bond and one nucleus is heterocyclic, and the other is isocyclic.

The nuclear substituent on any of the various diazines or thiazines or on any of the indicated azyl groups may be of the hydrocarbon radical type such as the saturated or unsaturated alkyl radicals, straight or branched chain or cyclic, monovalent mono- or di-substituent, for example, methyl, di-methyl, ethyl, di-ethyl, propyl, butyl, iso-butyl, amyl, allyl, methallyl, cyclopentyl and -hexyl, cyclo-pentenyl and the like, or an aryl radical such as phenyl, tolyl, naphthyl, or aralkyl radical as benzyl and the like, or polyvalent as polyalkylene such as polymethylene, e .g., tetramethylene and the like, or may be a radical containing oxygen or sulfur as the hydroxyl group or an alkoxy group such as methoxy, ethoxy, propoxy and the like, or the corresponding sulfur analog radical such as an alkylthio radical as methylthio or ethylthio group and the like, or the carbalkoxy radical as carbmethoxy, carbethoxy or carboxy and the like, or may also be a halogen radical, for example, chlorine or bromine. One or more nuclear substituents may occur on the same heterocyclic nucleus, for example, on the pyrimidyl nucleus, and, in the latter case, they may be identical or different examples of the same type or of entirely different types.

The carboxyacyl group (remaining group when the hydroxy group is removed from only one of the at least two carboxyl groups of a polycarboxylic acid) may be derived from any desirable polycarboxylic acid, for example, aliphatic heterocyclic and aromatic, such as the aliphatic polycarboxylic acids as the saturated aliphatic polycarboxylic acids such as the dicarboxylic acids, oxalic and malonic acids and their methylene-non-substituted homologues, succinic, glutaric, adipic, pimelic, suberic, azelaic and sebacic acids and the like and derivatives thereof exemplified by malonic acid and its homologues, in any of which at least one of the hydrogens of at least one of the available chain methylene groups is replaced by any desirable substituent, for example, alkyl (saturated as well as unsaturated), hydroxy, amino, carboxyl, and the like. Of such derivatives, the saturated-alkyl-substituted-methylene type is shown by the monoalkyl examples as ethyl-malonic, butyl-malonic, iso-succinic (pyrotartaric or methyl-succinic) and ethyl-succinic acids, and the saturated-dialkyls by di-methyl-malonic and diethyl-malonic acids, and the unsaturated-alkyl by allyl-malonic acid. The hydroxy-substituted-methylene type is exemplified by tartronic (hydroxy-malonic) and malic (hydroxy-succinic, in the three isomeric forms) acids and the polyhydroxy-substituted by the dihydroxy type shown by tartaric (dihydroxy-succinic) acid and the tetrahydroxy example in talomucic acid. The amino-substituted-methylene type is demonstrated by aspartic (amino-succinic) and glutamic acids. The mixed-substituted-methylene type is shown by citramalic (2-hydroxy-2-methyl butanedioic) and citric acids, the latter serving also to point out the carboxylic-substituted-methylene type.

Unsaturated aliphatic dicarboxylic acids from which the carboxyacyl radical is derived correspond to any of the above mentioned saturated examples having at least four carbon atoms and further particularized by maleic and citraconic (methylmaleic) acids and their respective isomers, fumaric and mesaconic (methylfumaric) acids.

Other aliphatic polycarboxylic acids from which the carboxyacyl radical may be derived are the tribasic, saturated as well as unsaturated, acids exemplified respectively by tricarballylic and aconitic acids and derivatives thereof as those in which any of the methylene or chain hydrogens is replaced by any desirable substituent (as pointed out in relation to the dicarboxylic acids) illustrated by citric acid.

The aromatic (aryl) polycarboxylic acids from which the carboxyacyl radical may be derived may be an aryl dicarboxylic acid or aryl tricarboxylic acid as trimellitic acid as well as one containing up to six carboxyl groups, as mellitic acid, and those having replaceable hydrogen atoms may or may not have other substituents on the aromatic nucleus. Those having no substituents on the aromatic nucleus are illustrated by the aryl dicarboxylic acids, such as the isomeric phthalic acids, phthalic (ortho), isophthalic (meta) and terephthalic (para). In those having other substituents on the nucleus, such substituents may be illustrated by alkyl (mono- and di-), alkoxy, hydroxy, halo, nitro and other common groups, for example, xylidic (or uvitic, 5-methyl-1,3-dicarboxylicbenzene), cumidic (dimethyl-phthalic), hemipic (dimethoxy-phthalic), and coccinic (hydroxy-methyl-phthalic) acids.

The invention also includes the preparation of these specific carboxyacylaminophenylsulfonamidoazines which are made by heating the desired polycarboxylic acid, its anhydride, or an ester, such as an alkyl ester, or a monohalide, such as the monochloride or a monochloride of the ester, thereof with, for example, any of the desired aminophenylsulfonamidoazines, either merely together or in an inert reaction medium such as an inert solvent, and as in the latter case separating the desired end product or, as in the case of the use of the ester, liberating the end product by hydrolysis, preferably alkaline, and in any case, where necessary, subjecting it to purification as by recrystallization. Thus, for example, with the aliphatic dicarboxylic acids having less than four carbon atoms in the chain, the alkyl diester of the dicarboxylic acid is reacted with the aminophenyl sulfonamidoazine selected. With the aliphatic acids having four and five carbon atoms in the chain and with the aromatic polycarboxylic acids having two carboxyl groups ortho to each other, the desired anhydride is taken as the starting material, while with the aliphatic acids having over five carbon atoms in the chain and with the aromatic acids having no carboxyl group in ortho position to another carboxyl group, the free acid may be heated directly with the selected aminophenylsulfonamidoazine. If desired, the monohalide of the ester of any of the acids may be used as the starting material.

The invention may be illustrated by, but not restricted to, the following examples:

*Example 1.*—*2 - ($N^4$-phthalylsulfanilamido)-4-methyl pyrimidine.*—16.8 grams of phthalic anhydride is added in portions to a boiling suspension of 25 grams of 2-sulfanilamido-4-methyl-pyrimidine in 750 cc. of isopropyl alcohol. Boiling is continued for 15 minutes after the addition of the anhydride is complete. After cooling, the white solid obtained is filtered and washed with dilute hydrochloric acid and water. The 2-($N^4$-phthalylsulfanilamido) - 4-methylpyrimidine is purified by dissolving in dilute ammonia, diluting with alcohol and precipitating with hydrochloric acid. The product melts at 282–287° C., with decomposition.

By replacing the phthalic anhydride of Example 1 respectively by the anhydrides of succinic and diphenic acids, there are obtained respectively the following:

*Example 2.*—2-($N^4$-succinylsulfanilamido)-4-methyl-pyrimidine melting at 201–202° C. with decomposition.

*Example 3.*—2 - ($N^4$-diphenoylsulfanilamido) - 4-methyl-pyrimidine melting at 250–253° C.

*Example 4.*—A mixture of 10 grams of 2-sulfanilamidopyrimidine and 58.6 grams of ethyl oxalate is subjected to gentle reflux at 160° C. for 2½ hours. After cooling, the solid obtained is filtered and washed with dilute hydrochloric acid and water. 2.75 grams of the ethyl ester of 2-($N^4$ - oxalylsulfanilamidopyrimidine thus obtained, which melts at 230–231° C. with decomposition, after purifying by recrystallizing from methyl "cellosolve," is mixed with 36 cc. of 2.5% sodium hydroxide solution and the mixture warmed on the steambath for one-half hour. After cooling, the solution is acidified with dilute hydrochloric acid and the resulting 2-($N^4$-oxalylsulfanilamido)-pyrimidine purified by crystallizing from methyl "cellosolve" and water. It melts above 250° C. with charring.

*Example 5.*—By using ethyl malonate in place of the ethyl oxalate in the above example, the corresponding malonyl derivative of the sulfanilamidopyrimidine, 2-($N^4$-malonylsulfanilamido)-pyrimidine melting at 215–216° C., is obtained.

While Examples 1 and 2 respectively illustrate the carboxyacylsulfanilamidopyrimidines in which the pyrimidine nucleus is substituted, the 2-sulfanilamido-4-methyl-pyrimidine may be replaced by 2-sulfanilamido-pyrimidine and there are respectively obtained the following in which the pyrimidine ring is unsubstituted.

*Example 6.*—2 - ($N^4$ - succinylsulfanilamido) - pyrimidine melting at 212–213° C., and

*Example 7.*—2 - ($N^4$ - phthalylsulfanilamido) - pyrimidine melting at 320–322° C. with decomposition.

*Example 8.*—10 grams of 2-sulfanilamidopyrimidine and 8.7 grams of adipic acid are mixed and fused at 170–180° C. for one hour. After cooling, the reaction mixture is treated with 10% sodium hydroxide and filtered. The filtrate is acidified with hydrochloric acid and the resulting 2-($N^4$-adipylsulfanilamido)-pyrimidine recrystallized from a mixture of methyl "cellosolve" and alcohol after treating with charcoal. It melts about 188° C.

While in the preceding examples there have been shown certain 2-($N^4$-carboxyacylsulfanilamido)-pyrimidines, the invention is not restricted to the 2-pyrimidine compounds. It also includes as well the 4- and 5-pyrimidines, whether substituted or unsubstituted on the pyrimidine nucleus, for example:

4-($N^4$-succinylsulfanilamido) - 2-ethoxy-6-methylpyrimidine,

4 - ($N^4$ - phthalylsulfanilamido) - 2 - ethylthio-6-methylpyrimidine, 5-($N^4$-succinylsulfanilamido)-pyrimidine, and 5-($N^4$-phthalylsulfanilamido)-pyrimidine.

The invention is not limited to the carboxyacylsulfanilamido pyrimidines, and includes also corresponding derivatives of the other diazines and thiazines as the substituted as well as unsubstituted pyrazines as:

2-($N^4$-succinylsulfanilamido)pyrazine, 2-($N^4$-phthalylsulfanilamido)-pyrazine, 2 - ($N^4$ - phthalylsulfanilamido) - 3,6 - dimethylpyrazine, 2 - ($N^4$ - succinylsulfanilamido) - 3,6 - dimethylpyrazine, as well as the corresponding derivatives of pyridazines, substituted or unsubstituted, for example:

3-($N^4$-succinylsulfanilamido)-pyridazine, 3-($N^4$-phthalylsulfanilamido)-pyridazine, 3-($N^4$ - phthalylsulfanilamido)-6-methyl - pyridazine, and 3-($N^4$ - succinylsulfanilamido)-6-methyl - pyridazine.

By replacing the carboxyacyl group as the succinyl or phthalyl group, in any of the hereinabove disclosed compounds (including also the nuclearly substituted as well as the $N^1$-substituted compounds of the invention) by the carboxyacyl radical derived from any other polycarboxylic acid of the type hereinabove disclosed, by employing any suitable one of the above described procedures, the corresponding compounds of the invention with the correspondingly different carboxyacyl radical in place of the succinyl radical are obtained.

From the various exemplifications of the compounds of the invention, it is seen that they may be generally referred to as carboxyacylaminophenyl-sulfonamidoazines selected from the diazines and thiazines, in which the term "azines" is used generically to embrace not only those compounds in which the diazine or thiazine radical is derived from some particular diazine or thiazine by itself, but also those in which the diazine or thiazine radical or portion is derived from any of the other residues of a mono- as well as bi-nuclear diazine or thiazine compound, which are included in the definition of the element Az of the general formula for the compounds of the invention, as Az is hereinabove defined, and in which compounds of the invention, the amino radical through which the azine portion is attached to the sulfur, is either unsubstituted or substituted by a positive radical.

The products of the invention, in which M and T of the general formula are hydrogen are generally of practicably good water solubility, are usually neutral compounds, which become very substantially soluble in water when the free carboxyl group or groups in the product is, or are, converted to the carboxylate form by the use of the equivalent amount of sodium hydroxide or an amine or alkanolamine or of sodium bicarbonate. Thus, the compounds in which M and T are hydrogen may exhibit a solubility in water within about five or up to about ten per cent, whereas the carboxylate form of the same compound may have a solubility up to about fifty per cent and even higher.

The carboxylate form of any of the compounds of the invention may be prepared, for example, by adding to a small amount of water an excess of the compound over its solubility in water and dissolving the excess by stirring in a sufficient quantity of, for example, anhydrous sodium carbonate. The solution is preferably filtered and from the filtrate the highly soluble sodium salt can be isolated, for example, by adding an equal volume of alcohol and pouring the resulting solution into about 10 volumes of acetone. The substance thrown out of solution is permitted to settle and the supernatant liquid withdrawn and the residue preferably treated several times with fresh acetone. After decanting the acetone from the last treatment, the resulting desired sodium salt may be dried preferably under vacuum.

Other metal carboxylate salts of the compounds such as the copper, gold, iron and bismuth salts and the like may be obtained by reacting the alkali metal salt, preferably in aqueous solution, with a suitable soluble salt of the metal, the carboxylate salt of which is desired. The desired carboxylate salt is obtained by resulting double decomposition.

Among the various products of the invention, it has been found that those in which the carboxyacylamino radical is para in position to the sulfonamido radical possess particularly desirable properties especially insofar as intestinal antisepsis is concerned.

These compounds, applicable as intestinal antiseptics, exhibit such activity by the attachment to the various nuclear portions of the compound, of substituents the introduction of which into the basic nuclei leaves the compound substantially non-toxic so that it would cause no permanent injury to the subject when administered in the necessary therapeutic dosage. The metallic element in the compounds used as intestinal antiseptics are such that their inclusion in the compound introduces no similar unduly toxic characteristic.

In general, the carboxyacylsulfanilyl derivatives of the aminodiazines and aminothiazines, in which the carboxyacyl radical is aliphatic and contains four carbon atoms in the aliphatic chain (including the carbons of the carbonyl groups of said chain), are especially effective as such intestinal antiseptics for it is possible to build up a high concentration of them in the intestinal tract and without a simultaneously high blood level and yet with substantially no noticeable indication of toxic symptoms. Among these particularly effective compounds are not only those in which the aliphatic chain is saturated, such as those in which the carboxyacyl radical is derived from succinic, malic (the three isomeric forms), aspartic, citramalic, pyrotartaric, ethylsuccinic, tartaric and ketosuccinic acids and their substituted derivatives, but also those in which the aliphatic chain is unsaturated, such as those in which the carboxyacyl radical is obtained from maleic, citraconic, fumaric and mesaconic acids and their substituted derivatives. The $N^4$-carboxyacyl products of the invention show distinctive activity.

The various compounds, used as intestinal antiseptics, are administered orally, either in the form of tablets, capsules or powders of the solid material or as solutions of any desired concentration, exceeding, if desired, 50%.

In the specification and claims the carboxyacyl radical, as hereinabove defined, derived from specific polycarboxylic acids herein named, is designated by replacing the terminal "-ic" in the name of the acid by the ending "-yl", as, for example, the succinyl, oxalyl, malonyl, phthalyl, maleyl, adipyl, glutaryl, aspartyl, tartaryl, fumaryl, mesaconyl, and citryl carboxyacyl radicals and the like, derived respectively from succinic, oxalic, malonic, phthalic, maleic, adipic, glutaric, aspartic, tartaric, fumaric, mesaconic, and citric acids and the like.

While the invention has been primarily illustrated by the para-carboxyacylsulfanilamido-diazines and -thiazines, the corresponding meta-carboxyacylamino compounds are also suitable and the various examples illustrative of these particular para - carboxyacylsulfanilamidoazines are respectively of the corresponding meta-carboxyacylaminobenzenesulfonamido-diazines and -thiazines by considering them as rewritten herein with the $N^4$-amino group in the position meta to the sulfonamido group.

The term "carboxyacylamino" as used in this specification and the accompanying claims refers to such substituted amino group as linked to the benzene ring in para or meta position to the sulfonamido group and in which the carboxyacyl group, as defined for example, in column 3, lines 41-44, is linked to said amino nitrogen through the carbon atom of the carbonyl radical remaining from the carboxyl group from which the hydroxyl group has been removed.

While the bacterial preparations constituting the invention have been described by reference to certain specific embodiments thereof, other modifications, extensions or substitutions may be made therein within the scope of the depending claims as limited by the state of the art.

I claim:

1. A compound selected from the group consisting of 2-($N^4$-succinylsulfanilamido)-4-methyl-pyrimidine and 2-($N^4$-succinylsulfanilamido)-pyrazine.

2. 2-($N^4$ - succinylsulfanilamido) - 4 - methyl-pyrimidine.

3. 2-($N^4$-succinylsulfanilamido)-pyrazine.

MAURICE L. MOORE.

REFERENCES CITED

The following references are of record in the file of this patent:

UNITED STATES PATENTS

| Number | Name | Date |
| --- | --- | --- |
| 2,300,676 | Kharasch et al. | Nov. 3, 1942 |
| 2,323,651 | Dohrn et al. | July 6, 1943 |
| 2,351,333 | Gysin | June 13, 1944 |

FOREIGN PATENTS

| Number | Country | Date |
| --- | --- | --- |
| 510,691 | Great Britain | Oct. 30, 1937 |
| 515,412 | Great Britain | Feb. 28, 1938 |
| 843,415 | France | Mar. 27, 1939 |
| 114,821 | Australia | Mar. 3, 1942 |
| 547,976 | Great Britain | Sept. 21, 1942 |

OTHER REFERENCES

Journal Amer. Chem. Soc., May 1939, pp. 1198-1200.

Journal Amer. Chem. Soc., Aug. 1940, pp. 2002-2005.

Chemical Reviews, August 1940, pp. 107, 156-159.

Proc. Soc. Exp. Biol. and Med., vol. 48 (Oct. 1941), p. 129.

Journal Amer. Chem. Soc., Nov. 1941, pp. 3028-3030.